Figure 1:
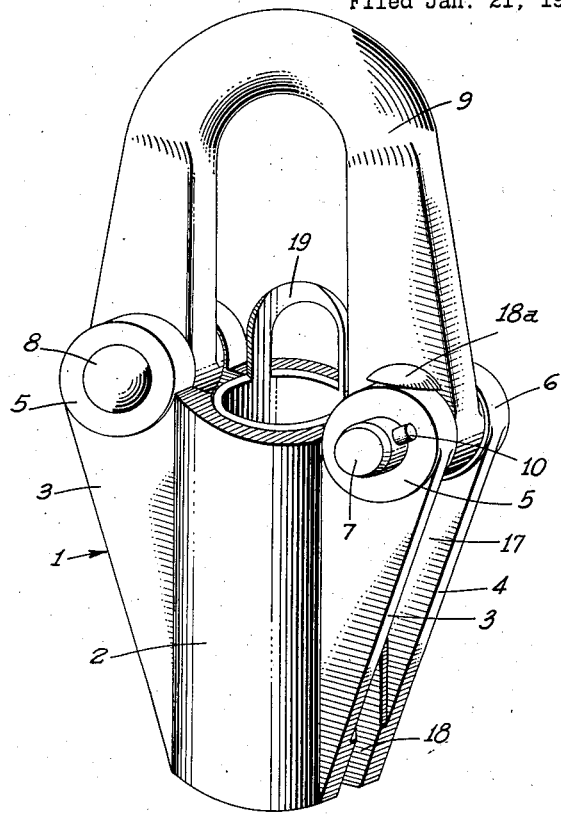

July 11, 1939. J. P. RATIGAN 2,165,413

CABLE END LINK

Filed Jan. 21, 1939

INVENTOR.
JAMES P. RATIGAN
BY Harold W. Mattingly
ATTORNEY.

Patented July 11, 1939

2,165,413

UNITED STATES PATENT OFFICE 2,165,413

CABLE END LINK

James P. Ratigan, Los Angeles, Calif.

Application January 21, 1939, Serial No. 252,205

4 Claims. (Cl. 294—78)

My invention relates to a cable end link to be employed upon the end of hoisting cables passing over blocks or sheaves.

In the oil industry it is common practice to employ, during the drilling operations, hoisting cables which pass over a crown block structure at the upper end of the derrick and over a travelling block by which various pieces of apparatus are lifted, lowered, or suspended during the manipulations required for the drilling of the well. After the well has been completed and is placed in production, the cables which had previously been employed are usually removed. Whenever it is necessary to perform further operations upon the well such as the setting or removal of pump tubing, pumps, sucker rods, and the like, a new cable must be brought to the well and strung over the crown block and over such travelling blocks as may be needed for the job.

Heretofore considerable difficulty has been encountered in re-stringing the blocks for the reason that cable end links, eyes, and the like which are necessary to connect the cable ends to travelling blocks, "dead-end", or other points of attachment for the ends of the cables are of such size that they will not readily pass through the spaces provided in the crown blocks or travelling blocks and for this reason the "stringing-up" operations entailed considerable time and effort due to the necessity for "stringing" the cables without the cable end links and then requiring the attachment of the links after the cables have been strung through the various blocks.

It has heretofore been the practice to pass the new cables around the various blocks and then secure the end of the cable to a cable end link as by bending the cable back upon itself to form an eye, the free end of the cable being clamped to the standing portion of the cable by means of bolted cable clamps or bull-dog clamps. Such bending back of the cable, however, injures the cable so as to require the cutting off and discarding of the bent end of the cable substantially each time the cable is strung on a job.

It has been suggested to employ removable cable end links into which the cable ends may be inserted and in which slips are provided for gripping the free end of the cable to hold it in place within the link. However, such slips are loosened each time tension is relieved upon the cable and in instances where the cable end link assumes a downward or inverted position the release of tension on the cable permits the slips to fall away from the cable end links, making such arrangement extremely dangerous in the handling of heavy objects. Moreover, each time the slips grip the cable there is a tendency for the slips to score and injure the various strands or wires of the cable, making it necessary to frequently cut off and discard the ends of the cables.

It is therefore an object of my invention to provide a cable end link assembly which includes a cable end ferrule which may be permanently secured upon the end of the cable and which is of a sufficiently small diameter as compared with the diameter of the cable as to permit it to be readily threaded through the openings in the crown blocks without removal of the ferrule from the cable end and in which a cable end link socket is provided to detachably receive the ferrule in such manner as to prevent accidental disengagement of the ferrule and socket.

Another object of my invention is to provide a cable end link assembly as set forth in the preceding paragraph in which the socket is provided with a laterally extending slot or opening through which the cable may be passed laterally into alignment with the socket so that a subsequent longitudinal movement of the cable relative to the socket will seat the ferrule securely in the socket.

Another object of my invention is to provide a cable end link of the character set forth in the preceding paragraphs wherein the socket member is formed with a hinged bail which passes across the open end of the socket and prevents the ferrule from falling therefrom even though the assembly be employed in an inverted position.

Another object of my invention is to provide a structure as set forth in the preceding paragraphs wherein the entire assembly is extremely simple in its construction and economical to manufacture and maintain.

Figure 2:
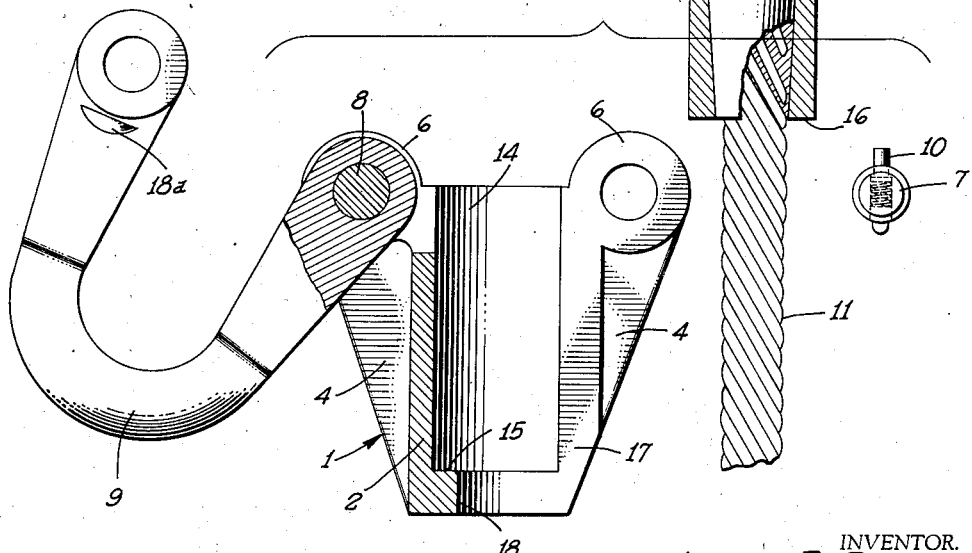

Other objects and advantages of my invention will be apparent from a study of the following specification, read in connection with the accompanying drawing, wherein:

Fig. 1 is a perspective view illustrating the cable end link of my invention with the bail thereof in the closed position and the cable end ferrule inserted in the socket portion of the link; and Fig. 2 is an exploded view, partly in section, illustrating the details of construction of the link body and its relation to the hinged bail member, together with details of the manner of attachment of the cable end ferrule to the end of a cable, and the manner in which such an assembly may be inserted in the link structure.

Referring to the drawing, I have illustrated in Fig. 1 the preferred embodiment of my invention as comprising a cable end ferrule to be permanently secured to the cable end and a separate cable end link and socket member 1 to which the ferrule may be detachably secured. The cable end link and socket member 1 preferably includes a body portion 2 having a substantially cylindrical cross-section and bearing a plurality of reinforcing buttress memebrs 3 and 4 disposed in pairs on opposite sides of the cylindrical body portion 2. The buttress members 3 and 4 are preferably formed integrally with the body portion 2 and extend upwardly and outwardly, terminating at their upper ends adjacent the upper end of the body portion 2 in bosses 5 and 6. The boss members 5 and 6 are provided with coaxial bores adapted to receive pins or bolts 7 and 8.

I also provide a member 9 by which the end link may be readily and detachably attached to a traveling block, a "dead-man", or any other object to which the end of the cable is to be secured, such member 9 being illustrated herein as an inverted U shaped bail having bores through each of the downwardly extending arms adapted to be aligned with the bores in the bosses 5 and 6 so as to receive the pins 7 and 8 and securely attach the bail 9 to the body portion 2 of the cable end link.

I prefer to permanently secure the pin 8 to its associated bosses 5 and 6 and make the pin 7 readily removable from the bores in which it is received so that by providing a relatively loose fit between the pin 8 and the opening in the arm portion of the bail 9 which receives this pin, removal of the pin 7 will allow the bail 9 to be pivotally moved about the pin 8 into an open position such as illustrated in Fig. 2.

This construction allows the bail 9 to be looped or hooked into any suitable ring or attaching eye provided in the device to which it is desired to secure a cable end fitted with this device. This may be accomplished by moving the bail 9 into the open position in the manner described, passing it through the ring or link and then pivotally moving the bail into the closed position as illustrated in Fig. 1. Reinsertion of the pin 7 then securely attaches the bail 9 to the body portion 2 of the cable end link so as to prevent such pivotal movement until the pin 7 is again removed.

While I prefer to permanently secure the pin 8 to its associated bosses 5 and 6, this pin may also be made readily removable as is the case with the pin 7 so that removal of both pins will completely disassociate the bail 9 from the body portion 2 and permit the attaching of the cable end link to hoisting rings or eyes in those specific applications where the clearances are so small as to prevent the use of the hinged type bail previously described.

Accidental removal of the pin 7 is preferably prevented by providing each end of said pin with a transversely extending pin 10 secured to the protruding ends thereof, the pins 10 protruding a distance sufficient to engage the faces of the bosses 5 and 6 and prevent axial movement of the pin through the bores in these bosses. At least one of the pins 10 is preferably slidably mounted in a suitable bore in the pin 7 so that it may be depressed to a point where the protruding end thereof is substantially flush with the outer surface of the pin 7. Such a slidable mounting for one of the pins 10 preferably includes a resilient member (not shown) normally urging the pin outwardly into the locking position illustrated in Fig. 1, such outward movement being arrested in the locked position by means of a suitable internal head or boss (not shown) engaging a flange formed by a reduced diameter portion of the bore in which said pin is carried.

With this type of construction the movable one of the pins 10 may be depressed until its outer end lies substantially flush with the outer surface of the pin 7 whereupon the pin 7 may be slid axially through the bores in which it is received so as to release the bail 9 and allow it to be moved to the open position.

In order to permit the ready attachment and detachment of the cable end to the link and socket member 1, I provide a cable end ferrule 12 to be permanently secured upon the free end of the cable in any suitable manner. The ferrule 12 is preferably formed as an elongated, cylindrical member having an external diameter but slightly in excess of the diameter of the cable 11 to which it is attached so that this ferrule may readily pass through the openings in the crown block or travelling block over which the cable is to be strung. The ferrule 12 is preferably provided with a tapered internal bore 13 terminating at its lower end in an opening substantially equal to the diameter of the cable 11 with which it is to be associated so that the free end of the cable may be inserted through the smaller end of the bore, the cable then being frayed out within the bore 13 and a filler such as solder, lead or Babbitt metal poured into the bore to fill up the same and rigidly and permanently fix the cable end in the ferrule.

The socket member 1 is provided with a longitudinally extending socket or recess 14 preferably cylindrical shape and adapted to snugly receive the cable end ferrule 12 therein, the socket 14 terminating near the lower end of the body member 2 in a flange portion 15 which defines a bottom against which the lower end 16 of the ferrule may seat to prevent passage of the ferrule downwardly through the socket member 1.

In order that the cable 11, together with the ferrule 12 permanently secured thereto may be readily inserted in the socket member 1 with ferrule 12 in position in the socket 14, I provide a laterally extending slot 17 disposed between one of the pairs of buttress members 3 and 4 and communicating with the socket 14. The slot 17 is made of a width sufficient to pass the cable 11 and is carried into the socket member 1 a sufficient distance to provide an opening 18 in the bottom of the socket 14 so that if the parts are disposed in the position illustrated in Fig. 2, the cable 11, together with its ferrule 12 may be moved to the left, as viewed in this figure, passing the cable 11 through the slot 17 into axial alignment with the bore 14.

Downward movement of the cable 11 will cause the cable end ferrule 12 to seat in the socket 14 with the bottom 16 of the ferrule engaging the flange or socket bottom 15.

While I have illustrated for the preferred embodiment of my invention the ferrule 12 as being cylindrical in shape and the socket 14 as being similarly shaped and provided with a bottom for preventing passage of the ferrule 12 therethrough, I also comprehend the use of other coacting shapes for these members.

After the ferrule is placed in its socket, the bail 9 may be moved to the closed position and there locked. I prefer to make the dimensions of the bail 9 such that when the bail 9 is in the closed position the length of the space between the underside thereof and the top of the body portion 2 is less than the length of the ferrule 12. When the bail 9 is locked in the closed position, escape of the cable is therefore prevented since upward movement of the ferrule 12 is restricted by engagement between the upper end thereof and the bail 9, while lateral movement of the cable 11 is prevented by the encompassing effect of the socket 14 relative to the ferrule 12.

It will be noted that the provision of the inwardly extending slot 17 allows considerable latitude as regards the positioning of the bail member 9 in the closed position, the bail 9 being movable either passed the closed position so as to cause misalignment between the bores receiving the pin 7, or may be moved an insufficient distance to likewise cause misalignment of these bores.

In order to make it possible for a user of my cable end link to readily and easily insert the pin 7, I provide a stop member 18a attached to or formed integrally with the arm portion of the bail member 9 which is associated with the pin 7. The stop member 18a is so disposed as to engage the upper end of the buttress member 3 and arrest movement of the bail member 9 toward the closed position at the time the bores through the bail member and the bosses 5 and 6 are in alignment to receive the pin 7. It follows therefore that insertion of the pin 7 is readily and easily accomplished, the bail 9 being swung in a clockwise direction, as viewed in Fig. 2, until the stop member 18a engages the upper end of the buttress member 3 and prevents further pivotal movement. The pin 7 is then easily inserted since the engagement of the stop member 18a with the upper end of the buttress member 3 guarantees the alignment of the bores in which the pin 7 is to be inserted.

I also prefer to provide the upper end of the ferrule member 12 with a small eye structure 19 to which a Manila rope, or other light line may be tied as a means for pulling the cable 11 with the ferrule 12 through the various blocks and sheaves.

It will be noted that the cable end link constructed in accordance with my invention permits the ready attachment or removal of the link from the end of a cable whenever it is desired, but prevents the accidental disengagement of the cable from the link by the releasing of the load in the cable.

It will be further noted that it is impossible for the cable to become disconnected from the end link without such disconnection being performed intentionally and that such intentional disconnection may be readily and easily accomplished without the use of tools.

It is to be further noted that the cable end link of my invention provides a ready and simple means of "stringing up" temporary or permanent hoisting mechanisms and allows rapid hooking up and unhooking of such rigging without damage to the cable.

While I have shown and described the preferred embodiment of my invention, I do not desire to be limited to any of the details of construction shown or described herein, except as defined in the appended claims.

I claim:

1. In a cable end link for attaching the end of a cable to an object, the combination of: a cable end ferrule permanently secured to said cable end; a socket member defining a ferrule receiving socket extending longitudinally thereof and having one end open to permit passage of said ferrule into and out of said socket; a bail member comprising a U shaped member having each of its arms disposed on opposite sides of the open end of said socket; and means pivotally securing one of said arms to one side of said socket to permit movement of said bail member about an axis extending transversely of a line joining the ends of said arms from a normal position extending across the open end of said socket to prevent passage of said ferrule into and out of said socket to an abnormal position disposed out of alignment with said socket to permit insertion or removal of said ferrule from said socket.

2. In a cable end link for attaching the end of a cable to an object, the combination of: a cable end ferrule comprising an elongated member extending along said cable and permanently secured to the end thereof; a socket member including a body portion having an elongated ferrule receiving socket extending longitudinally therein and open at one end to permit passage of said ferrule into and out of said socket; a longitudinally extending slot formed in said body portion extending from the exterior thereof and into communication with said socket for passing said cable, said slot having a width greater than the diameter of said cable and less than the width of said ferrule; attaching means for attaching said socket member to said object; means pivotally mounting said attaching means to said socket member at one side of the open end of said socket for movement from a normal position extending across the open end of said socket to prevent passage of said ferrule into and out of said socket to an abnormal position disposed out of alignment with said socket; and means extending transversely across said slot and engaging said attaching means for locking said attaching means in said normal position to prevent the escape of said ferrule from said socket and for preventing passage of said cable through said slot.

3. In a cable end link for attaching a cable to an object, the combination of: an elongated ferrule permanently secured upon the end of said cable; a socket body having therein an elongated ferrule receiving socket, one end of which is open to permit longitudinal passage of said ferrule into and out of the socket; a slot in said body member extending longitudinally of said socket and having a width less than the diameter of the ferrule and greater than the diameter of the cable to permit passage of the cable laterally into said socket; a U-shaped member for attaching said body to an object; means pivotally mounting said member at one side of said body to permit movement about an axis extending transversely of a line joining the ends of the U-shaped members from an open position disposed out of alignment with said socket to permit free longitudinal passage of said ferrule out of the open end of said socket, to a working position disposing said member across the open end of said socket and blocking longitudinal passage of said ferrule from said socket; and means for rigidly locking said member in its working position.

4. In a cable end link for attaching a cable to an object, the combination of: an elongated ferrule permanently secured upon the end of said cable; a socket body having therein an elongated ferrule receiving socket, one end of which is open to permit longitudinal passage of said ferrule into and out of the socket; a slot in said body member extending longitudinally of said socket and having a width less than the diameter of the ferrule and greater than the diameter of the cable to permit passage of the cable laterally into said socket; a U-shaped member for attaching said body to an object; means pivotally mounting said member at one side of said body to permit movement about an axis extending transversely of a line joining the ends of the U-shaped members from an open position disposed out of alignment with said socket to permit free longitudinal passage of said ferrule out of the open end of said socket, to a working position disposing at least a portion of said member across said socket and spaced from the open and thereof by a distance less than the length of said ferrule to block longitudinal passage of said ferrule from said socket; and means for rigidly locking said member in its working position.

JAMES P. RATIGAN.